United States Patent
Eck

(10) Patent No.: US 9,579,973 B2
(45) Date of Patent: Feb. 28, 2017

(54) SYMMETRIC ENGINE AND TRANSMISSION COUPLER

(71) Applicant: Arctic Cat Inc., Thief River Falls, MN (US)

(72) Inventor: Brian G. Eck, Bemidji, MN (US)

(73) Assignee: Arctic Cat Inc., Minneapolis, MN (US)

( * ) Notice: Subject to any disclaimer, the term of this patent is extended or adjusted under 35 U.S.C. 154(b) by 26 days.

(21) Appl. No.: 14/683,067

(22) Filed: Apr. 9, 2015

(65) Prior Publication Data
US 2016/0297298 A1  Oct. 13, 2016

(51) Int. Cl.
*B60K 17/00* (2006.01)
*B60K 17/04* (2006.01)
*F16H 57/025* (2012.01)
*B60K 8/00* (2006.01)

(52) U.S. Cl.
CPC ............... *B60K 17/00* (2013.01); *B60K 8/00* (2013.01); *F16H 57/025* (2013.01)

(58) Field of Classification Search
CPC ............. B60K 5/04; B60K 8/00; B60K 17/00; B60K 17/04; B60K 17/06; B60K 17/08; B60K 17/342
See application file for complete search history.

(56) References Cited

U.S. PATENT DOCUMENTS

| | | |
|---|---|---|
| 3,730,462 A | 5/1973 | Dick |
| 3,762,671 A | 10/1973 | Schulz |
| 4,610,421 A | 9/1986 | Ohta |
| 4,744,547 A | 5/1988 | Hartel |
| 4,958,810 A | 9/1990 | Gold |
| 5,044,813 A | 9/1991 | Gregg |
| 5,305,847 A | 4/1994 | Mefford |

(Continued)

FOREIGN PATENT DOCUMENTS

| | | |
|---|---|---|
| JP | 2000108689 A | 4/2000 |
| JP | 2005306373 A | 11/2005 |

OTHER PUBLICATIONS

Arctic Cat, Inc. Online Store, Retrieved Oct. 4, 2016, from http://store.arcticcat.com/parts#/Arctic_Cat/2010_ATV_700_DIE-SEL_EFT_GREEN/ENGINE_AND_EXHAUST_%5b96193%5d/2%7c%7e96183/2%7c%7e96183%7c%7e0745-040, 2 Pages.
Honda Parts Finder—Crank Case FL400RA (90) FL Models, Retrieved Oct. 4, 2016, from http://www.hondaparts-direct.com/OEMpartfinder.htm?aribrand=HOM&arian=fl%20models#/Honda/FL400RA_(90)_FL_MODELS,_JPN,_VIN%23_JH3TE160-LK100001/CRANKCASE/FL400R-90-JPN-A/2Y14HE0KE1AHE04E0700AA, 2 Pages.
Honda Parts Finder—Reduction Case FL400RA (90) FL Models, Retrieved Oct. 4, 20162, from http://www.hondaparts-direct.com/OEMpartfinder.htm?aribrand=HOM&arian=fl%20models#/Honda/FL400RA_(90)_FL_MODELS,_JPN,_VIN%23_JH3TE160-LK100001/REDUCTION_CASE/FL400R-90-JPN-A/2Y14HE0KE1AHE04E1000AA, 2 Pages.

(Continued)

*Primary Examiner* — Frank Vanaman
(74) *Attorney, Agent, or Firm* — Lowe Graham Jones PLLC

(57) ABSTRACT

Systems, vehicles, and assemblies that include an prime mover, a transmission, and a coupler. The coupler couples the prime mover and the transmission. A preferred embodiment includes a system for forming a rigid body that includes a rotational prime mover and a transmission assembly. The transmission assembly transmits at least a portion of the rotational energy from the prime mover to a driven member at a frequency. The system includes a first and a second bridging member. Coupling the first bridging member to the second bridging member forms a symmetric bridge or coupler. The symmetric bridge is symmetric about a first plane of symmetry. Furthermore, coupling a first portion of the bridge to the rotational prime mover and coupling a second portion of the bridge to the transmission assembly forms the rigid body. The rigid body further includes the bridge.

2 Claims, 10 Drawing Sheets

(56) References Cited

U.S. PATENT DOCUMENTS

| | | | |
|---|---|---|---|
| 5,915,495 A * | 6/1999 | Kerlin | B62D 21/183 |
| | | | 180/291 |
| 6,213,240 B1 | 4/2001 | Buell | |
| 7,357,379 B2 | 4/2008 | Asano | |
| 7,506,718 B2 | 3/2009 | Morita et al. | |
| 7,575,088 B2 | 8/2009 | Mir | |
| 8,522,911 B2 | 9/2013 | Hurd et al. | |
| 2005/0126842 A1* | 6/2005 | Rasidescu | B60K 17/34 |
| | | | 180/291 |
| 2006/0058138 A1* | 3/2006 | Morita | F16H 9/18 |
| | | | 474/144 |
| 2012/0031688 A1* | 2/2012 | Safranski | B60G 3/14 |
| | | | 180/54.1 |
| 2012/0031693 A1* | 2/2012 | Deckard | B60K 13/02 |
| | | | 180/68.3 |
| 2013/0087393 A1* | 4/2013 | Vanderstegen-Drake | B62D 55/06 |
| | | | 180/9.1 |

OTHER PUBLICATIONS

Honda Parts Finder—Frame FL400RA (90) FL Models; Retrieved Oct. 4, 2016, from http://www.hondaparts-direct.com/OEMpartfinder.htm?aribrand=HOM&arian=fl%20models#/Honda/FL400RA_(90)_FL_MODELS,_JPR,_VIN%23_JH3TE160-LK100001/FRAME/FL400R-90-JPN-A/2Y14HE0KE1AHE04F2500BAA, 2 Pages.
Engine Mount/Transmission Mount Location; 3 Pages.
DEA Transmission Mount Dated Aug. 21, 2014; 3 Pages.

* cited by examiner

SYMMETRIC ENGINE AND TRANSMISSION COUPLER

TECHNICAL FIELD OF THE INVENTION

The disclosure relates generally to couplers employed to attach vehicle components and specifically to a symmetric coupler that is adapted to rigidly couple a transmission and an engine within a vehicle.

BACKGROUND OF THE INVENTION

Many vehicles include both an engine and a transmission. The transmission (along with other components) transmits or otherwise provides energy generated by the engine to the vehicle's wheels. Furthermore, the transmission may include a plurality of gears to insure that the transmission provides the energy to the wheels at a rotational frequency that is appropriate for the vehicle's current land speed. The transmission may be integrated with a differential and axle components to insure proper distribution of the transmitted energy to the left and right wheels. The engine and transmission are often linked by a chain or belt that transmits power from the engine to the transmission via the rotation of the belt.

A precise and rigid alignment between the engine and the transmission improves the efficiency of providing energy from the engine to the wheels. Furthermore, any components utilized to provide such a rigid alignment should not significantly increase the complexity, cost, manufacturability, or maintainability of the vehicle. It is for these and other concerns that the present disclosure is offered.

SUMMARY OF THE INVENTION

The present disclosure is directed towards systems, vehicles, and assemblies that include an prime mover, a transmission, and a coupler. The coupler couples the prime mover and the transmission. A preferred embodiment includes a system for forming a rigid body that includes a rotational prime mover and a transmission assembly. The transmission assembly transmits at least a portion of the rotational energy from the prime mover to a driven member at a frequency. The system includes a first and a second bridging member. Coupling the first bridging member to the second bridging member forms a symmetric bridge or coupler. The symmetric bridge is symmetric about a first plane of symmetry. Furthermore, coupling a first portion of the bridge to the rotational prime mover and coupling a second portion of the bridge to the transmission assembly forms the rigid body. The rigid body further includes the bridge.

In some embodiments, system further includes a first fastener. The first fastener is configured and arranged to couple the first bridging member to the second bridging member to form the symmetric bridge. In other embodiments, the system may further include including a first fastener and a second fastener. The first fastener is configured and arranged to couple the first portion of the bridge to the rotational prime mover. The second fastener is configured and arranged to couple the second portion of the bridge to the transmission assembly.

The symmetric bridge is symmetric about a second plane of symmetry that is substantially orthogonal to the first plane of symmetry. The first bridging member may be symmetric about the second plane of symmetry. In a preferred embodiment, the first bridging member is identical to the second bridging member.

In some embodiments, the bridge includes a first recessed portion and a second recessed portion. The first recessed portion is configured and arranged to receive a portion of the rotational prime mover. The second recessed portion is configured and arranged to receive a portion of the transmission assembly. The first bridging member includes a flange portion that is oriented substantially parallel to the first plane of symmetry. The first bridging member also includes a body portion that is oriented substantially orthogonal to the flange portion.

In at least one embodiment, the flange portion of the first bridging member includes a first aperture. The first aperture enables coupling the first portion of the bridge to the rotational prime mover. The first bridging member also includes a second aperture. The second aperture enables coupling the second portion of the bridge to the transmission assembly. The body portion of the first bridging member includes a third aperture that enables coupling the first bridging member to the second bridging member. The first bridging member includes a first surface. The second bridging member includes a second surface. The bridge includes a planar interface defined by the first surface abutting the second surface. The first plane of symmetry is coincident with the planar interface.

In some embodiments, a powertrain assembly includes an prime mover, an energy transmitter, and a mechanical coupler. The prime mover is configured and arranged to provide energy. The energy transmitter is configured and arranged to transmit energy provided by the prime mover. The mechanical coupler is configured and arranged to span a gap between the prime mover and the energy transmitter while mechanically coupling the prime mover and the energy transmitter. A position of the prime mover relative to the energy transmitter is rigidly fixed.

In a preferred embodiment, the mechanical coupler includes a first spanning member and a second spanning member. The first spanning member is configured and arranged to span a first portion of the gap between the prime mover and the energy transmitter while coupled to each of the prime mover and the energy transmitter. The second spanning member is configured and arranged to span a second portion of the gap between the prime mover and the energy transmitter while coupled to each of the prime mover and the energy transmitter. The first spanning member of the mechanical coupler may be configured and arranged to rigidly couple to the second spanning member of the mechanical coupler. The mechanical coupler is a rigid mechanical coupler. The first spanning member is symmetric to the second spanning member.

In at least some embodiments, the mechanical coupler includes a first lip portion, a second lip portion, and a body portion. The first lip portion couples to a first portion of the prime mover and couples to a first portion of the energy transmitter. The second lip portion couples to a second portion of the prime mover and couples to a second portion of the energy transmitter. The body portion is positioned within the gap between the prime mover and the energy transmitter when the mechanical coupler spans the gap.

A first spanning member may include the first lip portion of the mechanical coupler and first body portion. A second spanning member may include the second lip portion of the mechanical coupler and a second body portion. The body portion of the mechanical coupler includes the first body portion coupled to the second body portion. In some embodiments, the assembly further includes a first plurality of fasteners and a second plurality of fasteners. The first plurality of fasteners couple the mechanical coupler to the prime mover and the energy transmitter. The second plurality of fasteners couple a first member to a second member. The mechanical coupler includes the coupled first and second member.

In a preferred embodiment, the assembly further includes an energy coupler that rotationally couples the prime mover to the energy transmitter. The energy coupler rotationally transfers energy provided by the prime mover to the energy transmitter. The energy coupler may include a drive pulley, a driven pulley, and a rotational coupler. The drive pulley is rotationally coupled to the prime mover. The drive pulley rotates at a first frequency based on a frequency of the prime mover. The driven pulley is rotationally coupled to the energy transmitter to provide rotational energy from the prime mover to the energy transmitter at a second frequency. The rotational coupler rotationally couples the drive pulley to the driven pulley. The second frequency is based on a variable ratio between a first radius of the drive pulley and a radius of the second pulley. The rotational coupler may be a belt, such as a V-belt, or a chain. In a preferred embodiment, when spanning the gap between the prime mover and the energy transmitter, the mechanical coupler is positioned longitudinally intermediate a first rotational axis of the drive pulley and a second rotational axis of the driven pulley.

In various embodiments, a vehicle includes at least one environment engaging member, a frame, an energy source, a transmission assembly, and a coupler. The at least one environment engaging member is configured and arranged to engage with an environment to propel the vehicle through the environment. The frame supports the at least one environment engaging member, the energy source, and the transmission assembly.

The energy source includes an energy source output shaft and an energy source case. The energy source case houses at least a portion of the energy source and is coupled to the frame. The transmission assembly includes a transmission assembly input shaft, a transmission assembly output shaft, and a transmission assembly case. The transmission assembly input shaft is driven by the energy source output shaft. The transmission assembly output shaft drives the at least one environment engaging member. The transmission assembly case houses at least a portion of the transmission assembly and is coupled to the frame.

The coupler bridges a void that is longitudinally intermediate the energy source case and the transmission assembly case. The coupler is configured and arranged to couple to the energy source case and to couple to the transmission case to rigidly couple the energy source and the transmission assembly. In preferred embodiments, the coupler is a symmetric coupler. The symmetric coupler includes a first bridging member and a second bridging member. A first portion of the first bridging member is configured and arranged to couple to each of the energy source case and the transmission case. A first portion of the second bridging member is configured and arrange to couple to each of the energy source case and the transmission case.

A first portion of the void that is longitudinally intermediate the energy source case and the transmission assembly case receives a second portion of the first bridging member when the first bridging member is coupled to each of the energy source case and the transmission assembly case. A second portion of the void receives a second portion of the second bridging member when the second bridging member is coupled to each of the energy source case and the transmission assembly case. When the first bridging member is coupled to each of the energy source case and the transmission assembly case and the second bridging member is coupled to each of the energy source case and the transmission assembly case, the first bridging member is configured and arranged to couple to the second bridging member to form the symmetric coupler.

When the first bridging member is coupled to the second bridging member to form the symmetric coupler, the void that is longitudinally intermediate the energy source case and the transmission assembly case is configured and arranged to receive a portion of the symmetric coupler. The received portion of the symmetric coupler includes an interface between the coupled first and second bridging members. In preferred embodiments, the first bridging member is identical to the second bridging member.

In some embodiments, when the energy source case is coupled to the frame and the transmission assembly case is coupled to the frame, the void that is longitudinally intermediate the energy source case and the transmission assembly case is configured and arranged to receive a portion of the coupler. The coupler provides a rigid alignment between the energy source and the transmission assembly. In at least one embodiment, the vehicle further includes a continuously variable transmission (CVT). The CVT rotationally couples the energy source output shaft and the transmission assembly input shaft. The energy output shaft drives the transmission assembly input shaft. In a preferred embodiment, the coupler includes a plurality of structural ribs.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
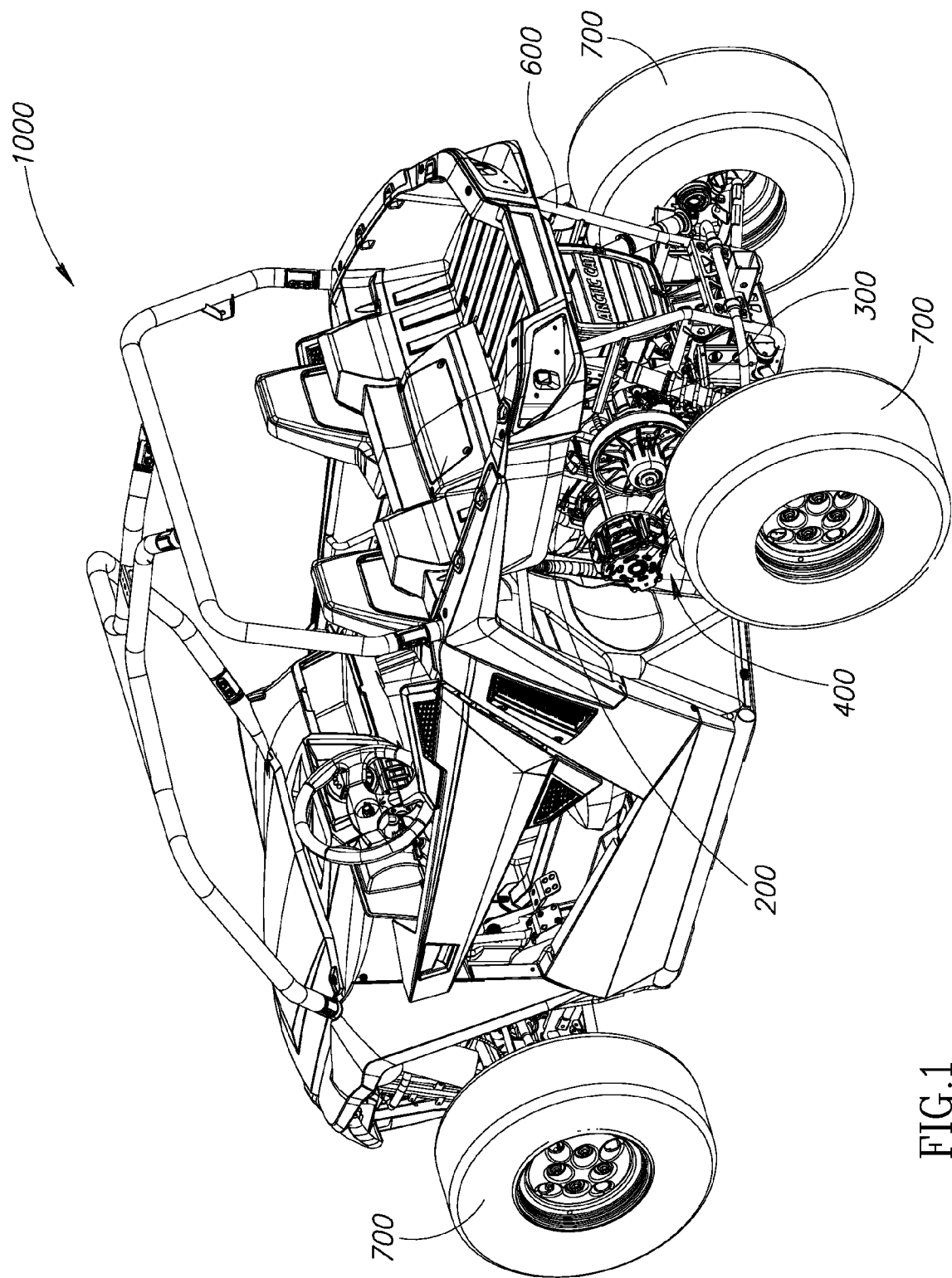
FIG. 1 illustrates a non-limiting exemplary embodiment of a vehicle.

FIG. 1 illustrates a non-limiting exemplary embodiment of a vehicle 1000. Vehicle 1000 is an all-terrain land vehicle and includes a prime mover 200, a transmission assembly 300, a plurality of environment engaging members 700, and a frame 600 that supports each of these components. It is to be understood that the disclosure presented herein is not limited to land vehicles, nor even vehicles. It is readily apparent that the various disclosed embodiments are extendable to any vehicle, system, or assembly that includes a generalized prime mover and a generalized assembly that transmits or distributes energy generated by the prime mover. For instance, the various embodiments are also employable in powered snow vehicles, watercraft, aircraft, and the like.

In vehicle 1000, the prime mover 200 provides energy to the transmission assembly 300. Vehicle 1000 includes a Continuously Variable Transmission (CVT) 400 to enable the energy communication or transfer from the prime mover 200 to the transmission assembly 300. The transmission assembly 300 distributes or otherwise transmits at least a portion of the provided energy to other driven components of the vehicle, such as the environment engaging members 700. Accordingly, the transmission assembly 300 may be an energy transmitter.

Figure 5A:
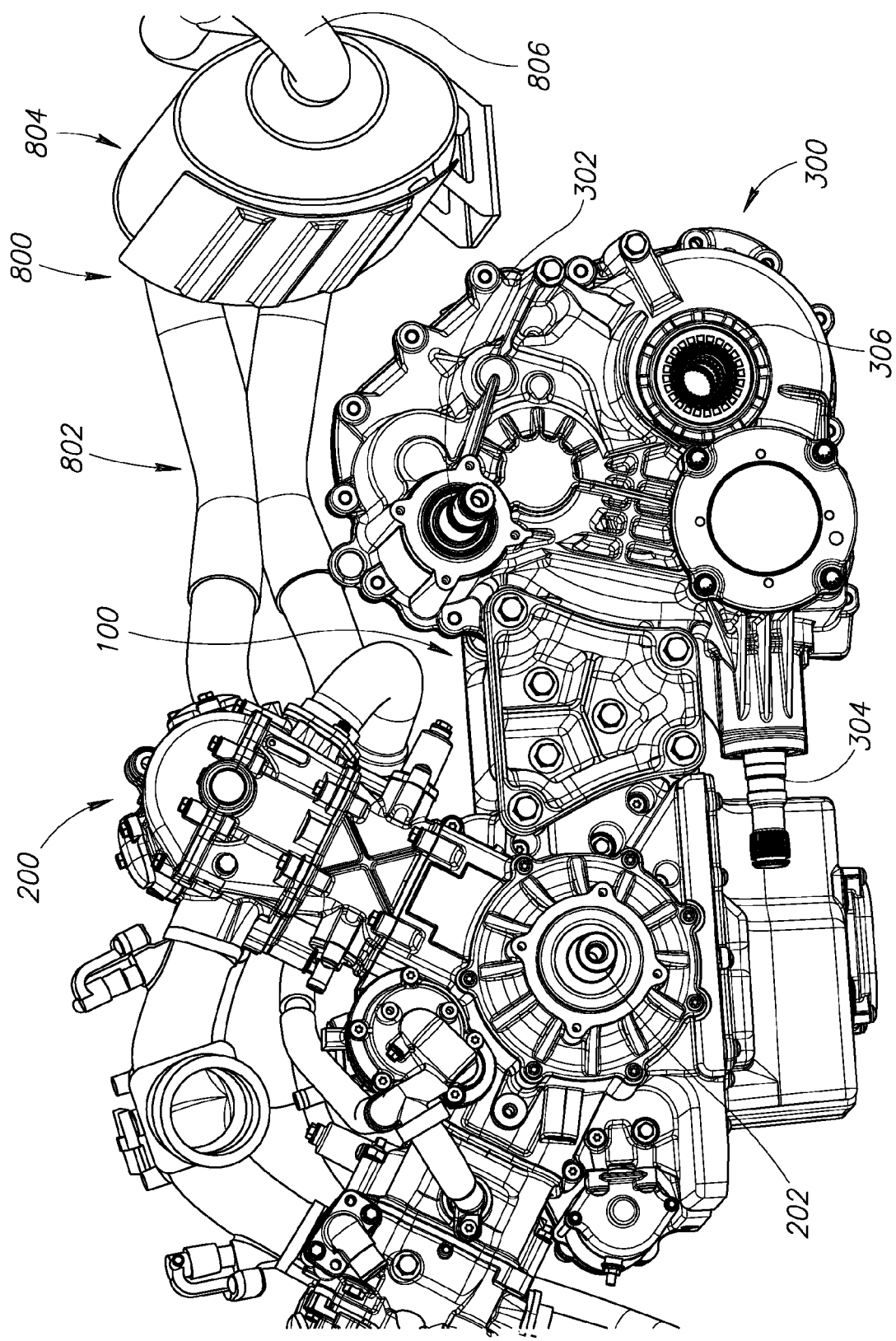
FIGS. 5A-5B show views of the rigid body of FIGS. 3A-3C, where the CVT is not installed but the vehicle's exhaust system is coupled to the prime mover.

Prime mover 200 may be a combustion engine, electric motor, a hybrid motor, or any other such device that converts stored energy into mechanical work. The stored energy may be stored in a battery, a liquid or gas fuel tank, or any other such energy storage means. Prime mover 200 provides the converted energy in the form of rotational energy via a rotating prime mover output shaft, such as a crankshaft. In preferred embodiments, the prime mover 200 includes an prime mover case or housing that at least partially houses the prime mover 200. The prime mover output shaft typically extends from an aperture in the prime mover case and is coupled to another member or shaft to provide the rotational energy. FIG. 5A shows one embodiment of an prime mover output shaft 202. The output shaft 202 extends out of an aperture in the prime mover housing (e.g., the crankshaft extending from the crankcase).

The transmission assembly 300 receives the rotational energy from prime mover 200 (via the CVT 400) and transmits or distributes the energy to other vehicle components, including but not limited to the environment engaging members 700. As shown in FIG. 1, the environment engaging members 700 are ground-engaging members. Specifically, the ground-engaging members include a pair of driven front wheels and a pair of driven rear wheels. However, other embodiments are not so limited and the environment engaging members 700 may be any members that engage with the environment to propel the vehicle through the environment. For instance, depending on the vehicle type, the environment engaging members may include, but are not limited to, snowmobile tracks, or impellers for watercraft or aircraft.

In some embodiments, the transmission assembly 300 includes a transmission input shaft and at least one transmission output shaft. Each input/output shaft preferably extends from one or more apertures in the transmission case or housing. For instance, FIG. 5A shows a splined transmission input shaft 302 and a splined transmission output shaft 304. In a preferred embodiment, the transmission output shaft transmits power to at least one of the environment engaging members 700, such as the front wheels of vehicle 1000. Transmission assembly 300 may also include at least one drive aperture that is configured and arranged to receive a driven axle or other such driven components. FIG. 5A further shows a splined drive aperture 306 that receives driven axles that in turn drive the rear wheels of vehicle 1000.

As noted above, the prime mover 200 provides the generated energy via a rotational coupling between the prime mover's output shaft and the transmission assembly's 300 input shaft. This rotational coupling may be accomplished with various means. As a non-limiting exemplary embodiment, FIG. 1 shows vehicle 1000 including a CVT 400 that enables such a coupling. The CVT 400 is rotationally coupled to each of the prime mover's output shaft and the transmission assembly's 300 input shaft. The prime mover's output shaft drives the CVT 400, which in turns drives the transmission assembly's 300 input shaft. Thus, CVT 400 may be an energy coupler that rotationally couples the prime mover 200 to the transmission assembly 300. The continuous range of gear ratios, provided by the CVT 400, enables a precise matching between the optimum (highest torque and/or horsepower) rotational frequency of the power source 200 and the rotational frequency of the ground engaging members 700 of vehicle 1000.

In a preferred embodiment, the transmission assembly 300 is a transaxle style transmission. The transaxle style transmission 300 includes an integrated rear differential to ensure the proper distribution of energy to the left and right rear ground engaging members 700. In at least one embodiment, the transmission assembly 300 includes a plurality of gears, such as a gear box, to further enable matching the prime mover's speed and/or direction (and optimum horsepower and torque) with the land speed and/or direction of vehicle 1000.

For any system, such as but not limited to vehicle 1000, that includes a prime mover and a separate transmission assembly, a precise, exact, and/or rigid alignment between the prime mover and the transmission assembly is a necessary requirement for the efficient energy transfer from the prime mover to the transmission assembly. For instance, when vibrational forces (induced from the prime mover) or any other forces (such as terrain induced forces on vehicle 1000) act upon at least one of the prime mover or the transmission assembly, the two components may undergo relative motion or otherwise become misaligned. Such a misalignment, even if slight, will negatively affect the efficiency of transferring energy from the prime mover to the transmission assembly. Furthermore, such a misalignment will negatively affect distributing the energy from the transmission assembly to the driven components of the system. For example, a misalignment affect the CVT belt temperatures, resulting in inefficient power transfer and reduced belt life.

In preferred embodiments of vehicle 1000, each of the prime mover 200 and the transmission assembly 300 is independently coupled to the vehicle frame 600. Elastomeric elements may be employed to mount the prime mover 200 and the transmission assembly 300 to frame 600. However, due to at least the inherent flex of frame 600, prime mover induced and/or terrain induced forces may have varying effects on the relative orientation or positioning between the prime mover 200 and the transmission assembly 300. Accordingly, various embodiments of a coupler that rigidly couples the prime mover and transmission assembly are presented herein. In various embodiments of vehicle 1000, the powertrain of vehicle 1000 includes the prime mover 200, the transmission assembly 300, and the prime mover/transmission assembly coupler.

The various embodiments of the rigid coupler form a rigid body that includes the prime mover 200 and the transmission assembly 300. Because the coupler forms a rigid body, the coupler may be a mechanical coupler. The coupler precisely fixes the relative orientation/alignment between the prime mover 200 and the transmission assembly 300. For instance, when coupled to each of the prime mover 200 and the transmission assembly 300 (to form the rigid body), the coupler forces the required, exact, and precise alignment between the prime mover 200 and the transmission assembly 300.

Furthermore, the rigid body formed by the coupler is extremely resistant to longitudinal (compressive, tension, shear), lateral, vertical, and torsional (or other rotational) forces. Due to various structural features of the coupler disclosed herein, the rigid body remains resistant to external forces even when a distance between the prime mover and the transmission assembly is increased (resulting in an increased corresponding lever arm of the rigid body). Thus, the exact and precise alignment between the prime mover 200 and the transmission assembly 300 is a rigid alignment.

During the operation of vehicle 1000, forces acting upon the prime mover 200 and/or the transmission assembly 300 will not induce a misalignment between the prime mover 200 and the transmission assembly 300. The coupler effectively avoids any relative motion between the prime mover 200 and the transmission assembly 300. Accordingly, the transfer of energy from the prime mover 200 to the transmission assembly 300, and the subsequent transmission of the energy to other vehicle components remains an efficient energy transfer/transmission/distribution during the operation of vehicle 1000. In addition, CVT belt temperatures are kept low.

Furthermore, the coupler enables the coupling of the prime mover 200 and transmission assembly 300 is a configuration where the prime mover 200 and the transmission assembly 300 are not or cannot be positioned directly adjacent to one another. Rather, as noted throughout, when the prime mover 200 and the transmission assembly 300 are spaced apart (creating a gap or void between them), the coupler spans and substantially fills the gap between the prime mover 200 and the transmission assembly 300. By substantially filling the gap, the strength of the rigid coupling is increased, increasing the resistance of the rigid body to external forces, such as torsional forces.

Figure 2:
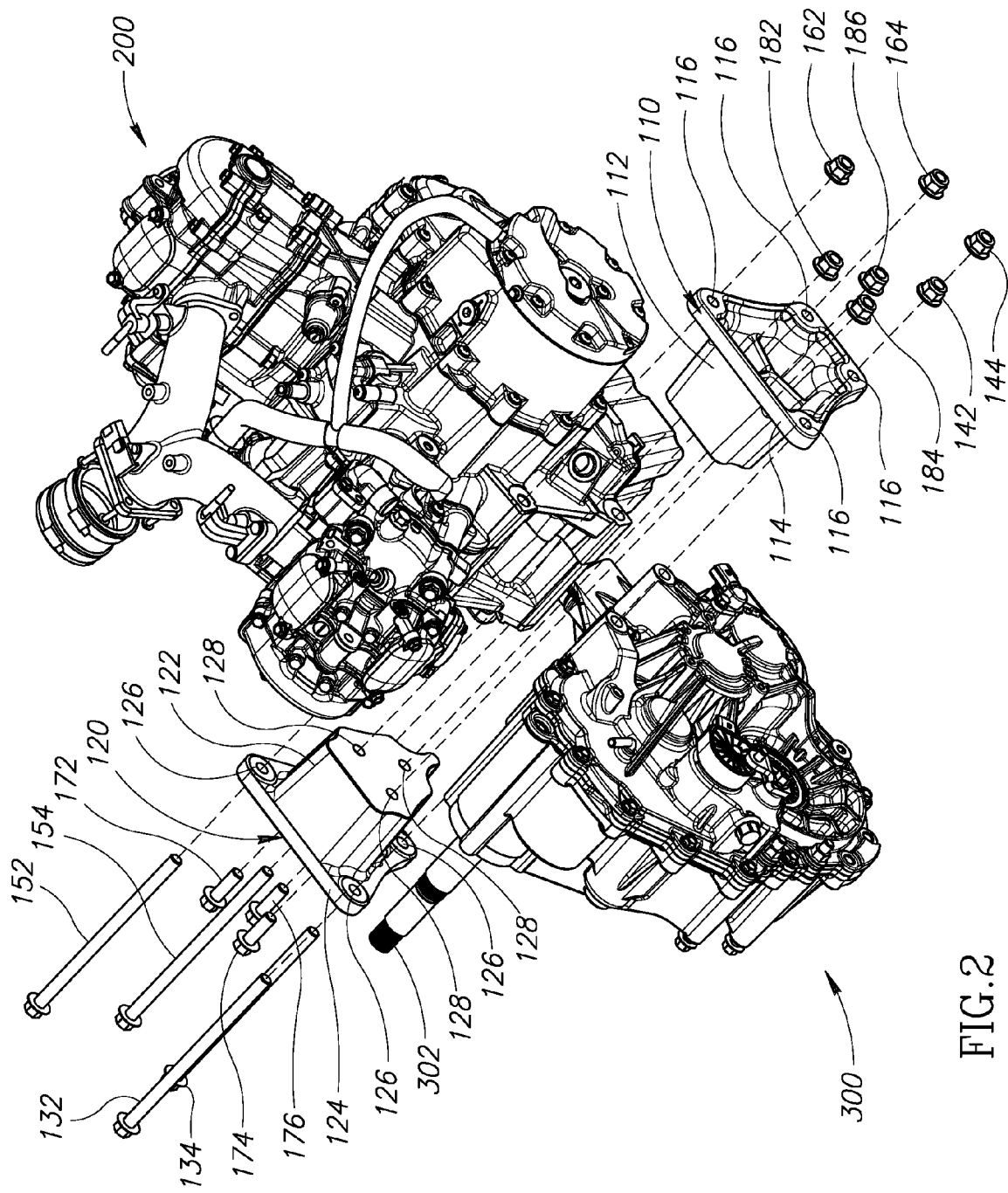
FIG. 2 provides an isometric view of a prime mover adjacent a transmission assembly, with an exploded view of a coupler that rigidly couples the prime mover and the transmission assembly.
Figure 3A:
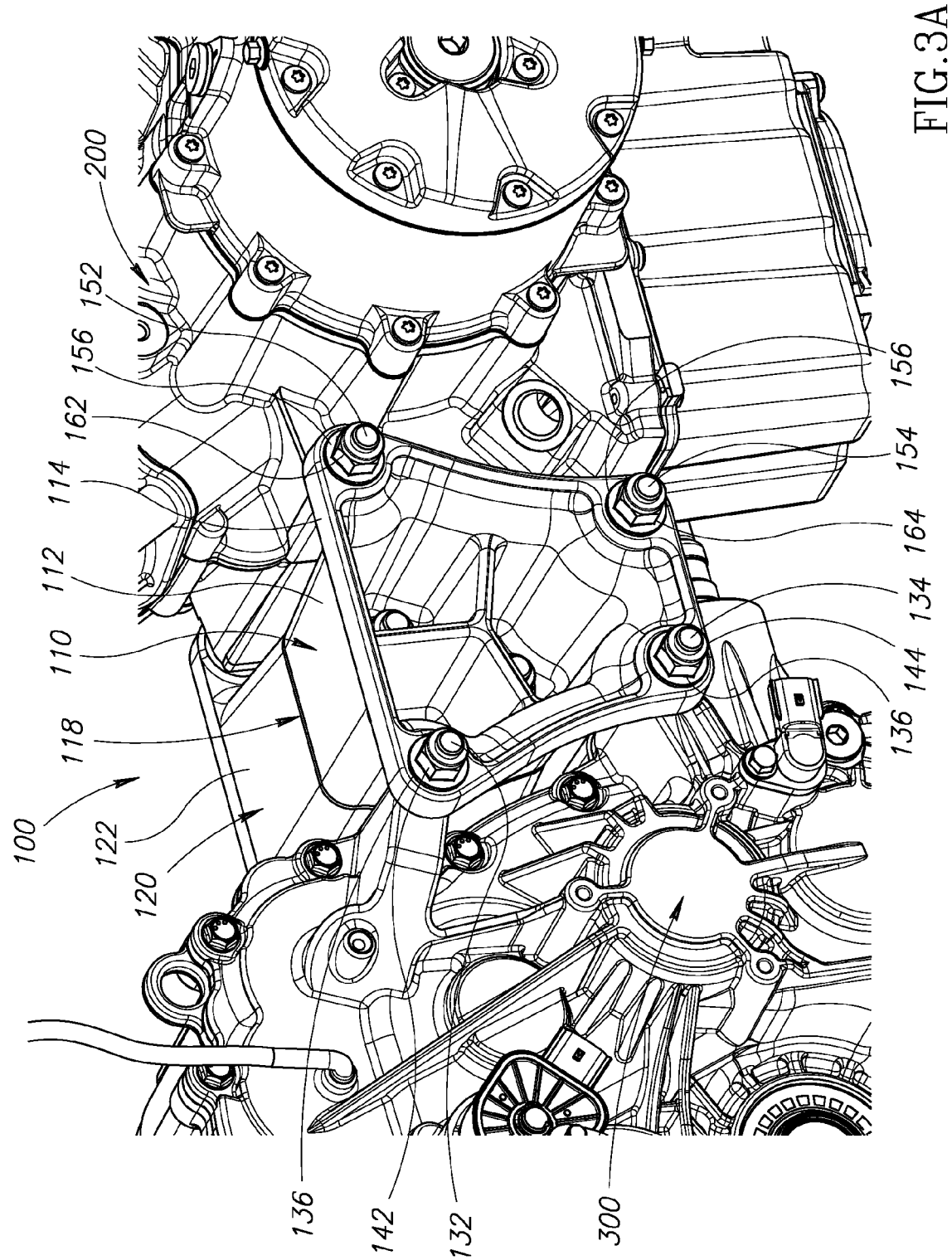
FIG. 3A shows an off-axis view of the prime mover, the transmission assembly, and the coupler of FIG. 2, coupled to form a rigid body that is consistent with the various embodiments disclosed herein.
Figure 3B:
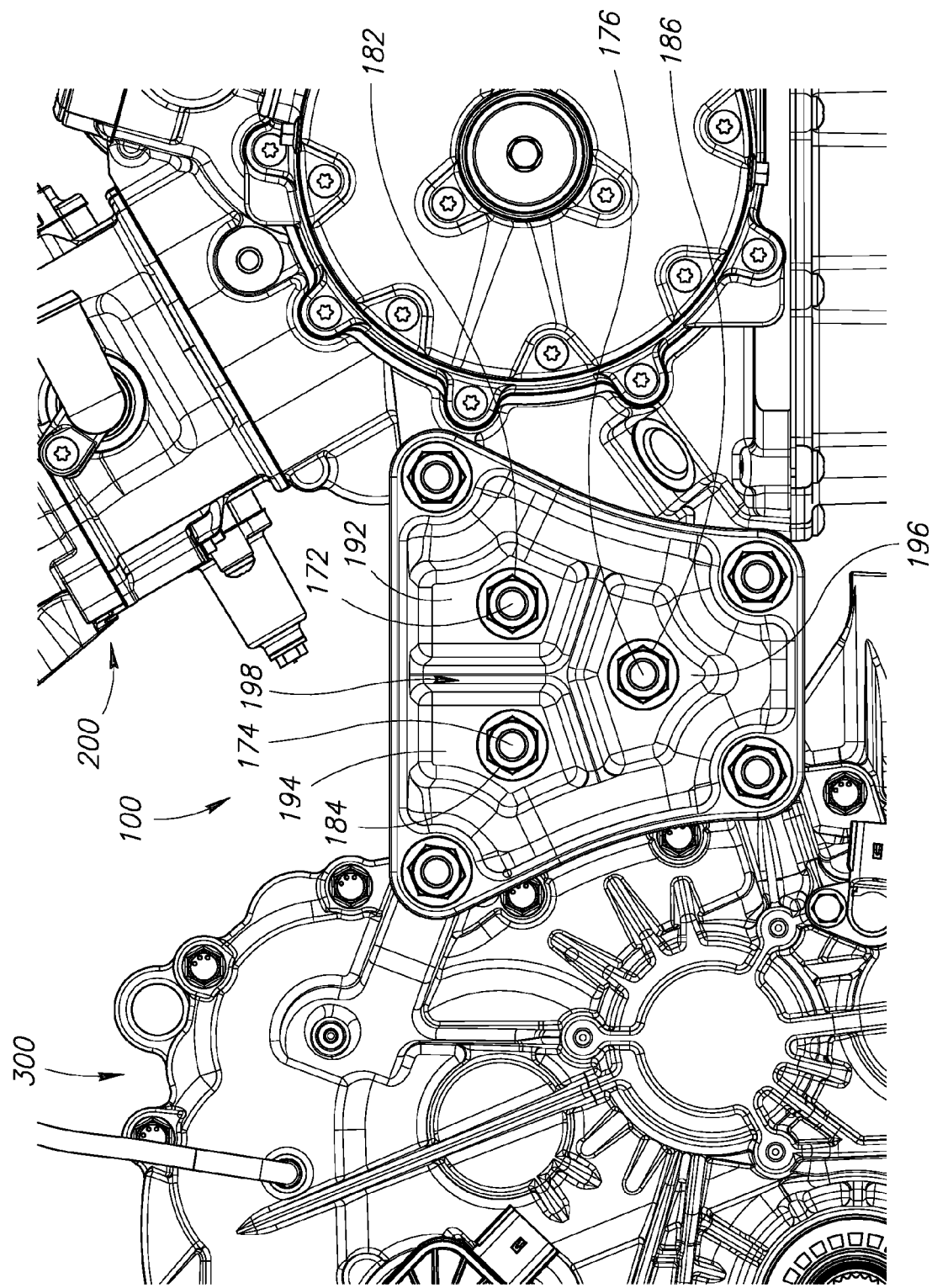
FIG. 3B shows a longitudinal side view of the prime mover, the transmission assembly, and the coupler of FIG. 2, coupled to form the rigid body that is consistent with the various embodiments disclosed herein.
Figure 3C:
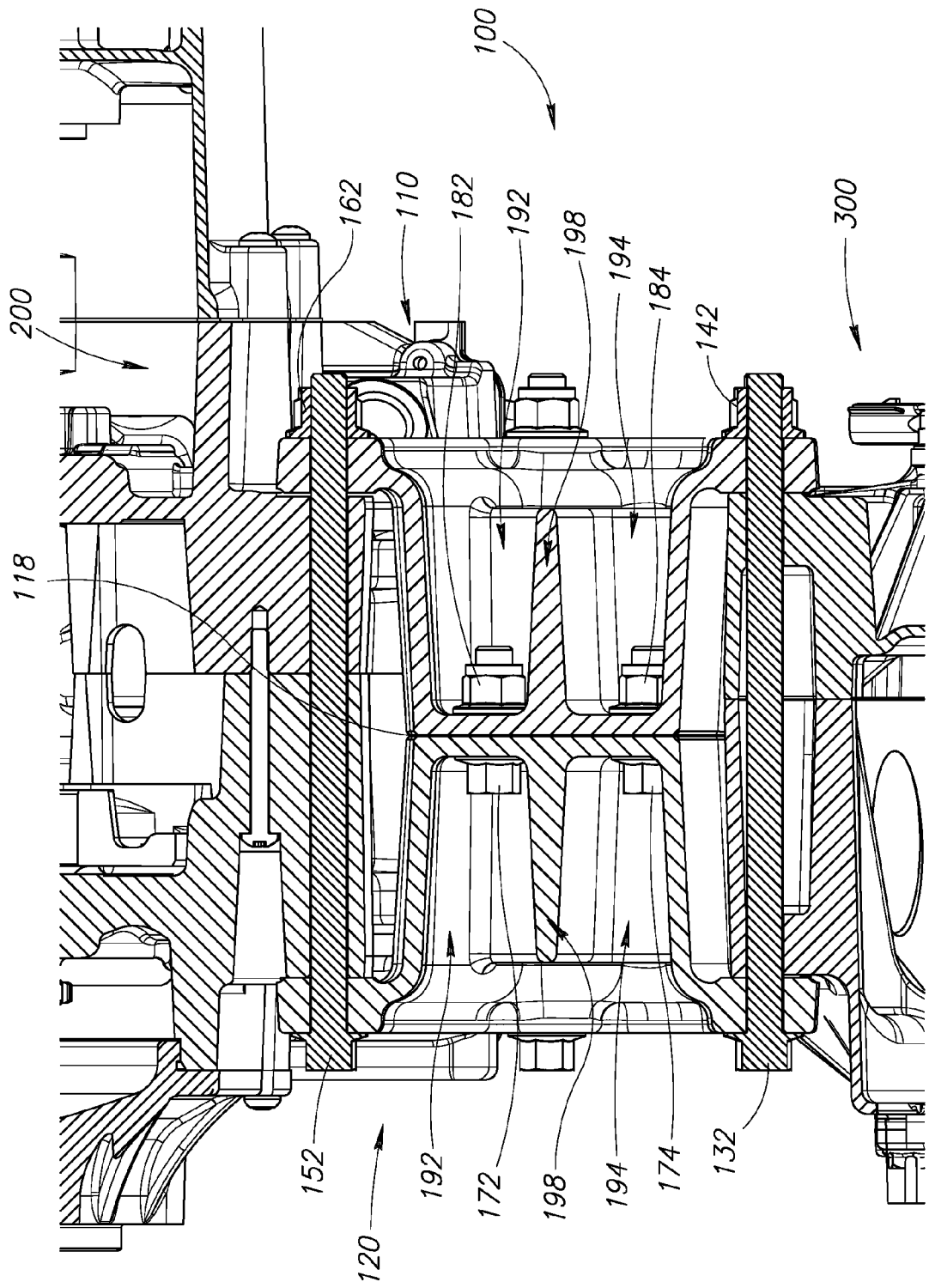
FIG. 3C shows a top view of the prime mover, the transmission assembly, and the coupler of FIG. 2, coupled to form the rigid body that is consistent with the various embodiments disclosed herein.

FIG. 2 provides an exploded view of a prime mover 200, a transmission assembly 300, and a multi-piece coupler. When assembled and coupled to each of the prime mover 200 and the transmission assembly 300, the multi-piece coupler rigidly couples the prime mover 200 and the transmission assembly 300 and forms a rigid body. FIGS. 3A-3C show various views of the assembled coupler 100 coupled to each of the prime mover 200 and the transmission assembly 300. In various embodiments, the coupler may be a mount because it rigidly mounts the prime mover 200 to the transmission assembly 300. As shown in FIG. 2, coupler 100 is preferably a two-piece coupler, although in at least one embodiment, the coupler us a single piece coupler. The coupler 100 includes a first coupler member 110 and a second coupler member 120. The first and second coupler members 110/120 are coupled to form the rigid coupler 100.

In preferred, but non-limiting embodiments, when installed within vehicle 1000, the formed rigid body is aligned in a longitudinal direction of vehicle 1000. As shown in FIG. 2, the rigid body (when assembled) includes a longitudinal axis. When installed in vehicle 1000, the longitudinal axis of the rigid body may be approximately parallel with the longitudinal axis of vehicle 1000.

When mounted to frame 600 of vehicle 1000, prime mover 200 is positioned forward of transmission assembly 300. As shown in the exploded view of FIG. 2, the coupler is positioned intermediate the prime mover 200 and the transmission source 300. It should be understood that other orientations of the rigid body are possible. For instance, in at least one embodiment, the longitudinal axis of the rigid body is oriented transverse to the longitudinal axis of vehicle 1000. In another embodiment, the transmission assembly 300 is positioned forward of the prime mover 200.

Figure 6:
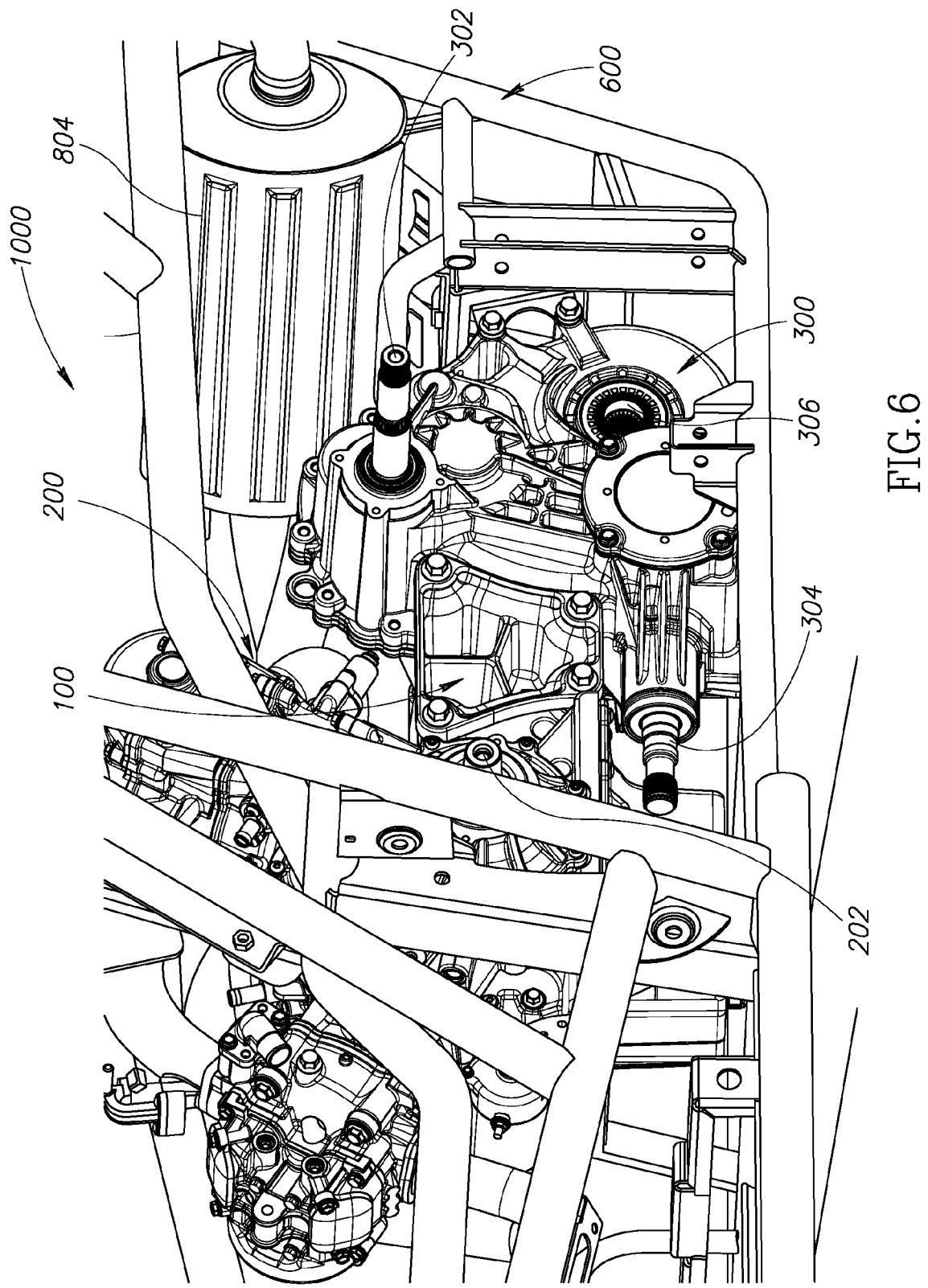
FIG. 6 illustrates the rigid body of FIGS. 3A-3C installed within and coupled to the frame of the vehicle of FIG. 1.

As shown in FIG. 3A-3C, coupler 100 spans or bridges the gap or void between the prime mover 200 and the transmission assembly 300. As shown in FIG. 6, each of the prime mover 200 and the transmission assembly 300 are coupled to the frame 600 of vehicle 1000. The relative mounting positions (within frame 600) of the prime mover 200 and the transmission assembly 300 provides the gap or void. In various embodiments, after the first and the second coupler members 110/120 are coupled to one another, the assembled coupler is inserted into, or received by, the gap between the mounted prime mover 200 and the transmission assembly 300. In other embodiments, each of the first and second coupler members 110/120 are first separately inserted into, or received by, the gap. After which, the first and second coupler members 110/120 are coupled together to form the coupler 100.

In a preferred embodiment, the prime mover 200 is coupled to transmission assembly 300, via the coupler 100, prior to positioning either of the prime mover 200 or the transmission assembly 300 within frame 600. In such embodiments, the single rigid body that includes the prime mover 200, the coupler 100, and the transmission assembly is positioned and installed within vehicle 1000 as a whole. However, other embodiments are not so constrained; and each of the prime mover 200 and the transmission assembly 300 may be positioned, or otherwise installed within frame 600, separately or individually, prior to coupling via the coupler 100.

Forming the coupler 100 from two separate members 110/120 provides numerous advantages over a single piece, or integrated coupler. For instance, inserting each of the first and second coupler members 110/120 into the gap prior to coupling the coupler members together may provide easier installation, as compared to a single-piece coupler. The two-part coupler enables the ability to position and assemble the coupler 100 in a tight space, such as when the prime mover 200 and the transmission assembly are already positioned within vehicle 1000 and the gap between the them is tight. Furthermore, the manufacture of two separate coupler members 110/120 may be easier than the manufacture of a single-piece coupler. Although a two-piece coupler is preferred, alternative embodiments include only a single or an integrated piece, such that the single piece coupler is received by the gap between the prime mover 200 and the transmission assembly 300.

In a preferred embodiment, the first and second coupling members 110/120 are identical coupling members and are positioned to face one another. Accordingly, the coupler may be formed by two identical halves that are secured, attached, or otherwise coupled. Thus, the coupler 100 is a symmetric coupler about a plane of symmetry that is defined by the interface between the coupled first and second coupler members 110/120.

Employing two identical members to form a coupler provides many advantageous over a single-piece coupler or even a multi-piece coupler that is formed by dissimilar members. For instance, employing two identical halves reduces an overall part count and increases the component volume of the identical halves. An increased volume of identical parts reduces the cost per part, as well as simplifies the installation of the coupler. For example, when installing each part, an installer need not worry about which part goes on the left side of the rigid body and which part goes on the right side because the parts are identical.

The resulting coupler may be cheaper to manufacture and it may be manufactured in a variety of methods. For instance, each of the first and second coupler members 110/120 may be machined from aluminum or any other machinable material. The coupler members may be sand cast, or any other such appropriate manufacture techniques may be employed.

Structural ribs or webbing may be machined or cast into the coupler members to increase structural integrity while simultaneously decreasing the mass of the coupler. Thus, the two-piece symmetric coupler (as compared to a single piece or asymmetric coupler) increases the rigidity between the prime mover 200 and the transmission assembly 300. The coupler is lightweight and is readily adaptable to any vehicle, system, or assembly that includes a prime mover and a transmission that require precise and rigid alignment.

As shown in FIGS. 3A-3C, when the coupler 100 is coupled to each of the prime mover 200 and the transmission assembly 300, a rigid body is formed. The rigid body includes the prime mover 200, the transmission assembly 300, and the coupler 100. Furthermore, as noted above, the coupler spans and/or bridges the gap or void between the prime mover 200 and the transmission assembly 300. Not only does the coupler span and/or bridge the gap, but the coupler also substantially fills the gap.

Accordingly, the coupler provides a precise, exact, and rigid alignment between the prime mover 200 and the transmission assembly 300. Because the prime mover 200 and the transmission assembly 300 are constrained as a rigid body, vibrational energy or other such forces swill not induce relative motion or a misalignment between the prime mover 200 and the transmission assembly 300. Accordingly, the prime mover 200 is enabled to efficiently transfer energy to the transmission assembly 300.

Because the coupler spans or bridges the gap or void, the first and second coupler members 110/120 may be bridging and/or spanning members. The first coupler member 110 includes a flange and/or lip portion 114 and a body portion 112. The flange portion 114 includes a first plurality of apertures 116 that enables coupling the coupler 100 (or the first coupler member 110) to each of the power source 200 and the transmission assembly 300. As shown in FIG. 2, the first plurality of apertures 116 includes four separate and distinct apertures, each positioned approximately at a corner portion of the flange portion 114. Although, it should be understand that the exact configuration of apertures 116 is not limited, and other embodiments may include any arrangement of apertures that enable the coupling of the first coupler member 110 to each of the prime mover 200 and the transmission assembly 300.

Likewise, second coupler member 120 includes a flange or lip portion 124 and a body portion 122. The lip portion 124 of the second coupler member 120 similarly includes a first plurality of apertures 126 that enables coupling the coupler 100 (or the second coupler member 120) to each of the power source 200 and the transmission assembly 300. Furthermore, the body portion 122 of the second coupler member 120 includes a second plurality of apertures 128 on a surface that mates with a similar surface on the body portion 112 of the first coupler member 110. When the first and second coupler members 110/120 are identical members, the first coupler member 110 includes a similar second plurality of apertures in the surface that mates with the similar surface of the second coupler member 120. The second set of apertures on each of the first and second coupler members 11/120 enables the coupling of the first coupler member 110 with the second coupler member 120 to form the coupler 100.

At least one coupler fastener is included to couple the first coupler member 110 to the second coupler member 120. Although any style of fastener or coupler may be employed to enable such a coupling, in a preferred embodiment, a bolt 172 and nut 182 pair is employed to fasten or couple the first and second coupler members 110/120 together. In preferred embodiments, a plurality of coupler fasteners are employed to form the rigid coupler 100. In the embodiment shown in FIG. 2, three bolts 172/174/176 and three corresponding nuts 182/184/186 are employed. The coupler bolts are received through the second plurality of apertures (128 on the second coupler member 120) to affix the mating surfaces of each of the first and second coupler members 110/120 together. The coupler nuts 182/184/186 are secured about the corresponding coupler bolts 172/174/176 to rigidly couple the first coupler member 110 to the second coupler member 120.

In a similar fashion, another plurality of fasteners are employed to fasten, couple, or attach the coupler to each of the prime mover 200 and the transmission assembly 300. As shown in FIG. 2, bolts, transmission case bolts 132/134 and another plurality of nuts, such as transmission case nuts 142/144 are employed to couple the first and second coupler members 110/120 (and hence the coupler) to the transmission assembly 300. Each of the transmission case bolts 132/134 are received by flange portion apertures 116/126 of the first and second coupler members 110/120, as well as corresponding apertures in the transmission assembly case, and the transmission nuts 142/144 are rotatably tightened to secure the coupler to the transmission assembly 300.

Furthermore, prime mover case bolts 152/154 and prime mover case nuts 162/164 are similarly employed via corresponding prime mover case apertures and flange portion apertures 116/126 to rigidly couple each of the first and second coupler members 110/120 to corresponding apertures in the prime mover case or housing. The input shaft 302 of the transmission assembly 300 is also shown in FIG. 2.

FIG. 3A shows an off-axis view of the prime mover 200, the transmission assembly 300, and the coupler 100 of FIG. 2, assembled and/or coupled to form a rigid body that is consistent with the various embodiments disclosed herein. Coupler 100 includes first and second coupler members 110/120 being coupled together. The flange portion 114 of first coupling member 110, as well as the body portions 112/122 of first and second coupling members 110/120 are prominently shown in FIG. 3A. Note that the flange or lip portion 114 is oriented substantially orthogonal or perpendicular to the orientation of the body portion 112 of first coupling member 110.

When the corresponding mating surfaces of the first and second coupling members 110/120 are mated, a coupler interface 118 is formed. Because the first and second coupler members 110/120 are identical coupler members, coupler 100 is symmetric about the plane defined by the coupler interface 118. Thus, coupler 100 may be a symmetric coupler.

The transmission fasteners (transmission assembly case bolts 132/134 and corresponding transmission assembly case nuts 142/144) are shown coupling coupler 100 to the transmission assembly 300. In some embodiments, at least one transmission assembly case washer 136 is employed to further enable the coupling. Likewise, the prime mover case fasteners (prime mover case bolts 152/154 and corresponding prime mover case nuts 162/164) couple the coupler 100 to the prime mover 200. Prime mover case washers 156 may further enable the coupling.

As shown in in FIG. 3A, the flange portion 114 of the first coupler member 110 spans or bridges the gap or void between the transmission assembly 300 and the prime mover 200, on the longitudinal side of the rigid body shown. Likewise, the flange portion of the second coupler member 120 spans the gap on the other longitudinal side of the rigid body. Thus, coupler 100 may be a bridge.

Furthermore, the body portions 112/122 of the first and second coupler members 110/120 substantially fill the gap or void. The flange portions and the body portions 112/122 form a first and a second recessed portion. The first recessed portion is configured and arranged to receive a portion of the prime mover case. Likewise, the second recessed portion is configured and arranged to receive a portion of the transmission assembly case. Accordingly, the rigid body formed by the symmetric coupler 100 coupling the prime mover 200 and the transmission assembly 300 is exceptionally resistant to torsional, compressive, tension, and shear forces. Thus, the prime mover 200 and the transmission assembly 300 remain in precise alignment when coupled together in this fashion.

FIG. 3B shows a side view of the prime mover 200, the transmission assembly 300, and the coupler 100 of FIG. 2, coupled to form a rigid body that is consistent with the various embodiments disclosed herein. The side view reveals further details regarding the coupler 100, and the identical coupler members 110/120. A structural rib 198 is shown from the side of the first coupler member 110. The structural rib 198 subdivides the coupler member 110 (and similarly 120) into three recessed portions 192, 194, 196. In additional to subdividing the coupler members, structural rib 198 enables decreasing a weight of the coupler members while maintaining strength, rigidity, and structural integrity of the coupling members.

The coupling fasteners are within the recessed portions 192/194/196. For instance, the coupler fastener bolt 172 and corresponding coupler nut 182 are positioned within recessed portion 192. Likewise, the other coupler fastener bolts 174/176 and corresponding fastener coupler nuts 184/186 are positioned within recessed portions 194 and 196 respectively. As also shown in this side view, the first and second coupler members 110/120 are each symmetric about the vertical plane projecting into and out of the page that FIG. 3B is projected on. Accordingly, coupler 100 is symmetric about this plane of symmetry, as well as the other plane of symmetry that is defined by coupler interface 118 of FIGS. 3A and 3C.

FIG. 3C shows a top view of the prime mover 200, the transmission assembly 300, and the coupler 100 of FIG. 2, coupled to form the rigid body that is consistent with the various embodiments disclosed herein. The structural ribs 198 of each of the first and second coupler members 110/120 form the upper recessed portions 192/194. The lower recessed portion 198 is not visible in FIG. 3C. The coupling between the first and second coupler members 110/120 is enabled, as least partially, by the coupler fasteners (coupler bolts 172/174 and corresponding coupler nuts 182/184). The coupler bolt-nut pairing 172/182 is positioned with the recessed portions 192 of first and second coupler members 110/120. Likewise, the coupler bolt-nut pairing 174/184 is positioned with the recessed portions 194 of the first and second coupler members 110/120.

The coupler interface 118 is clearly shown in FIG. 3C. Also shown is the transmission bolt-nut paring 132/142 that couples the coupler 100 to the transmission assembly 300. The prime mover nut-bolt pairing 152/162 couples the coupler 100 to the prime mover 200 to form the rigid body.

Figure 4A:
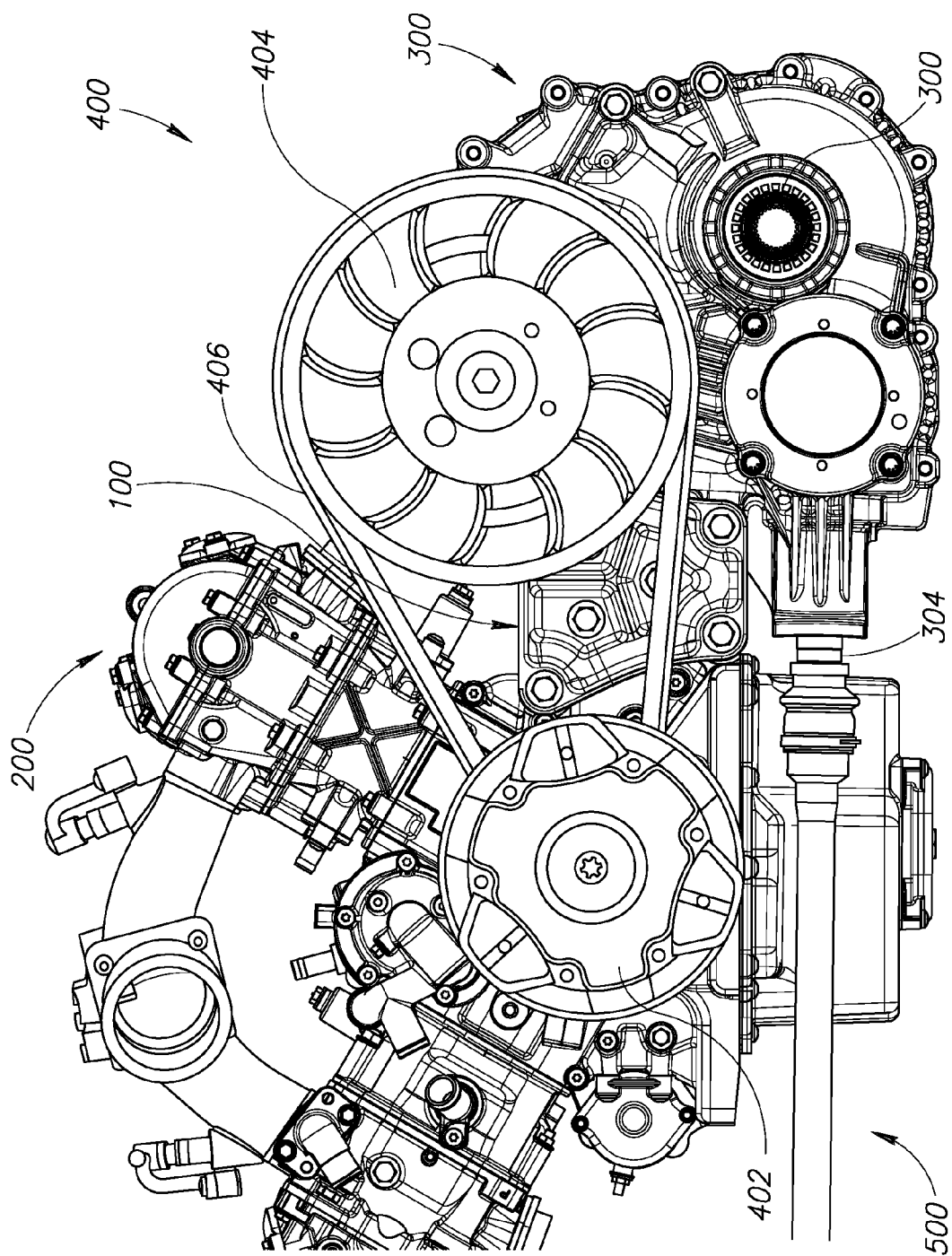
FIG. 4A provides a view of a first longitudinal side of the rigid body of FIGS. 3A-3C, where a Continuously Variable Transmission (CVT) is installed to rotationally couple the prime mover and the transmission assembly.

FIG. 4A provides a view of longitudinal side of the rigid body of FIGS. 3A-3C, where a Continuously Variable Transmission (CVT) 400 is installed to rotationally couple the prime mover 200 and the transmission assembly 300. The symmetric coupler 100 is shown coupling the prime mover 200 and the transmission assembly 300. The CVT 400 includes a drive pulley 402, a driven pulley 404, and a rotational member 406 that rotatably couples the drive pulley 402 and the driven pulley 404. Rotational member 406 may be a rotational coupler. The drive pulley 402 is rotatably mounted to an prime mover output shaft, such as output shaft 202 shown in FIG. 5A. Likewise, the driven pulley 404 is rotatably mounted to a transmission assembly input shaft, such as input shaft 302 of FIG. 5A. The rotational member 406 may be a belt, a chain, or any other such device that enables a transmission of rotational energy between the drive pulley 402 and the driven pulley 404.

The output shaft 304 of the transmission assembly is coupled to a front drive shaft 500 that drives the front ground-engaging members 700 of vehicle 1000 of FIG. 1. By employing coupler 100 to form a rigid body that is extremely resistant to compression, tension, lateral, shear, and torsional forces, the prime mover 200 and the transmission body 300 remain in an exact and precise alignment. Such an alignment enables an efficient energy transfer communication between the prime mover 200 and the transmission assembly 300 via the CVT 400.

Figure 4B:
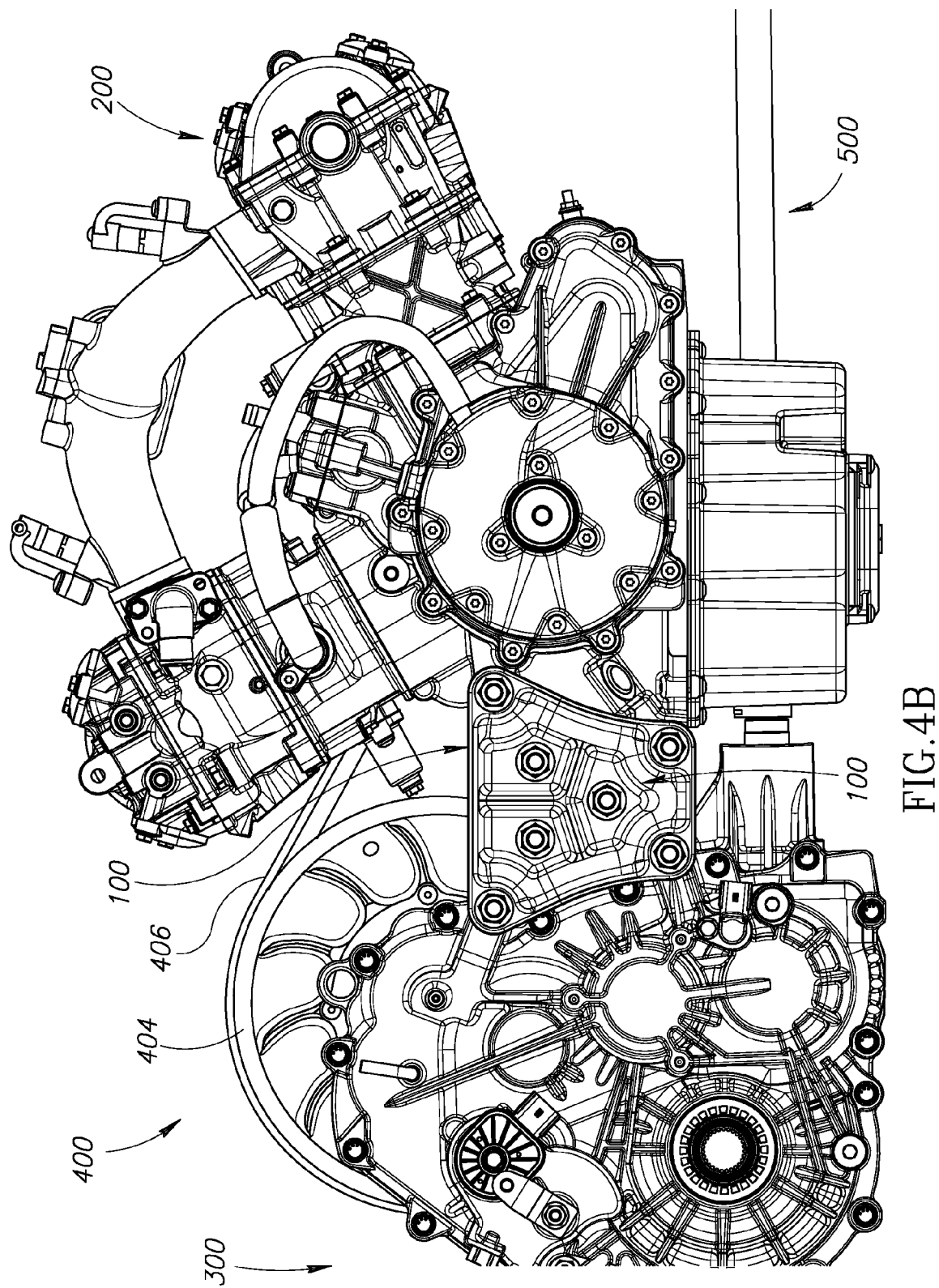
FIG. 4B provides a view of the second longitudinal side of the rigid body of FIGS. 3A-3C, where the CVT is installed to rotationally couple the prime mover and the transmission assembly.

FIG. 4B provides a view of the second longitudinal side of the rigid body of FIGS. 3A-3C, where the CVT 400 is installed to rotationally couple the prime mover 200 and the transmission assembly 300. The driven pulley 404 and the rotational member 406 are shown in the side view of FIG. 4B; however, the drive pulley 402 is hidden behind the prime mover case. Furthermore, FIGS. 4A and 4B show that the presence of coupler 100 does not interfere with the maintenance or access to the prime mover 200, the transmission assembly 300, or the CVT 400. In addition, in at least some embodiments, coupler 100 may be installed or removed even when the CVT 400 is in place.

FIG. 5A shows the first longitudinal side of the rigid body of FIGS. 3A-3C, where the CVT is not installed but the vehicle's exhaust system 800 is coupled to the prime mover 200. The exhaust system 800 includes exhaust ducts 802, a muffler 804, and an exhaust exit duct 806, which transports exhaust from the muffler 804 to the external environment of vehicle 1000.

Also shown in FIG. 5A is the prime mover output shaft 202, the transmission assembly input shaft 302, and a transmission assembly output shaft 304. In addition, not that the driven axles for the rear wheels of vehicle 1000 are not installed in the drive aperture 306 and the front wheel drive shaft is not installed on the transmission assembly output shaft 304. Coupler 100 is clearly shown bridging the gap between the prime mover 200 and the transmission assembly 300.

Figure 5B:
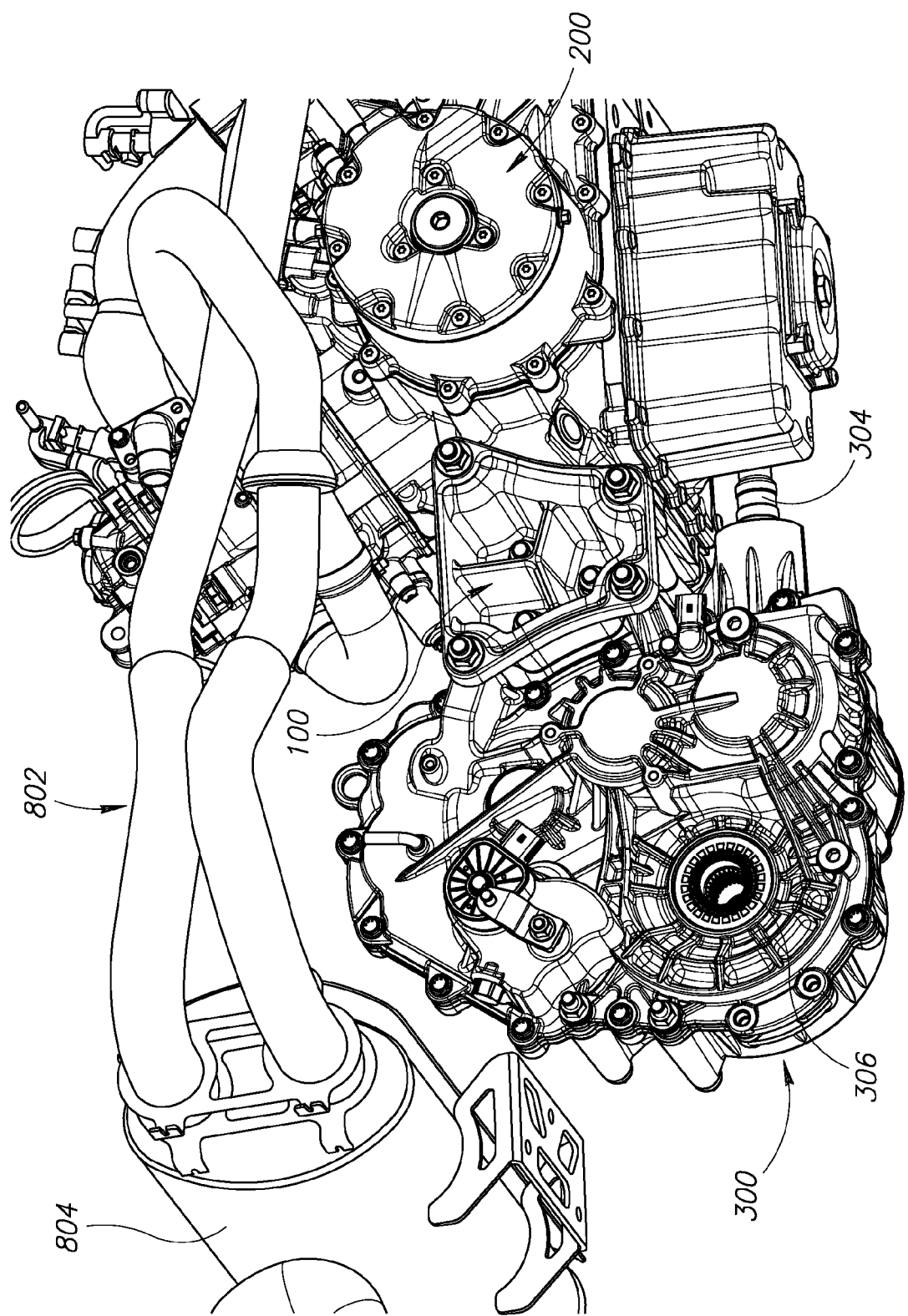

FIG. 5B shows another view of the rigid body of FIGS. 3A-3C, where the CVT is not installed but the vehicle's exhaust system 800 is coupled to the prime mover 200. Note that FIGS. 5A-5B show that the presence of coupler 100 does not interfere with maintenance or access to the prime mover 200 or the transmission assembly when the exhaust system 800 is installed. Furthermore, coupler 100 may be assembled and disassembled with exhaust system 800 is installed.

FIG. 6 illustrates the rigid body of FIGS. 3A-3C installed within and coupled to the frame 600 of the vehicle 1000 of FIG. 1. Elastomeric elements and corresponding brackets are employed to mount the prime mover 200 and the transmission assembly 300 to frame 600. As with FIGS. 5A-5B, the exhaust system 800, including muffler 804 has been installed. However, unlike FIGS. 4A-4B, the CVT 400 has not been installed yet. Thus, the prime mover's output shaft 202, as well as the transmission assembly's 300 input shaft 302 are shown. Further shown are the splined transmission output shaft 304 and the splined drive aperture 306.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for forming a rigid body that includes a rotational prime mover and a transmission assembly that transmits at least a portion of rotational energy from the prime mover to drive a member, wherein the system includes:
   a first bridging member; and
   a second bridging member;
   wherein coupling the first bridging member to the second bridging member forms a symmetric bridge that is symmetric about a first plane of symmetry;
   wherein coupling a first portion of the bridge to the rotational prime mover and coupling a second portion of the bridge to the transmission assembly forms the rigid body such that the rigid body further includes the bridge;
   wherein the first bridging member includes a flange portion that is oriented substantially parallel to the first plane of symmetry and a body portion that is oriented substantially orthogonal to the flange portion; and
   wherein the flange portion of the first bridging member includes a first aperture that enables coupling the first portion of the bridge to the rotational prime mover and a second aperture that enables coupling the second portion of the bridge to the transmission assembly and the body portion of the first bridging member includes a third aperture that enables coupling the first bridging member to the second bridging member.

2. A system for forming a rigid body that includes a rotational prime mover and a transmission assembly that transmits at least a portion of rotational energy from the prime mover to drive a member, wherein the system includes:
   a first bridging member; and
   a second bridging member;
   wherein coupling the first bridging member to the second bridging member forms a symmetric bridge that is symmetric about a first plane of symmetry;
   wherein coupling a first portion of the bridge to the rotational prime mover and coupling a second portion of the bridge to the transmission assembly forms the rigid body such that the rigid body further includes the bridge; and
   wherein the first bridging member includes a first surface and the second bridging member includes a second surface, wherein the bridge includes a planar interface defined by the first surface abutting the second surface such that the first plane of symmetry is coincident with the planar interface.

* * * * *